United States Patent
Madathil

(10) Patent No.: US 11,183,376 B2
(45) Date of Patent: Nov. 23, 2021

(54) SYSTEM AND METHOD FOR DETERMINING SET OF MASS TO CHARGE RATIOS FOR SET OF GASES

(71) Applicant: Atonarp Inc., Tokyo (JP)

(72) Inventor: Karthikeyan Rajan Madathil, Karnataka (IN)

(73) Assignee: ATONARP INC., Tokyo (JP)

( * ) Notice: Subject to any disclaimer, the term of this patent is extended or adjusted under 35 U.S.C. 154(b) by 351 days.

(21) Appl. No.: 16/462,676

(22) PCT Filed: Nov. 21, 2017

(86) PCT No.: PCT/JP2017/041816
§ 371 (c)(1),
(2) Date: May 21, 2019

(87) PCT Pub. No.: WO2018/097129
PCT Pub. Date: May 31, 2018

(65) Prior Publication Data
US 2020/0273686 A1    Aug. 27, 2020

(30) Foreign Application Priority Data
Nov. 23, 2016 (IN) .............................. 201641040089

(51) Int. Cl.
*H01J 49/00* (2006.01)
*G06F 17/16* (2006.01)
*H01J 49/16* (2006.01)

(52) U.S. Cl.
CPC .......... *H01J 49/0036* (2013.01); *G06F 17/16* (2013.01); *H01J 49/164* (2013.01)

(58) Field of Classification Search
CPC ...... H01J 49/00; H01J 49/0036; H01J 49/164; H01J 49/0027; G06F 17/16
See application file for complete search history.

(56) References Cited

U.S. PATENT DOCUMENTS 5,247,175 A     9/1993  Schoen et al.
5,352,891 A  * 10/1994  Monnig .............. H01J 49/0036
                                                          250/282
(Continued)

FOREIGN PATENT DOCUMENTS

CN     101534933 B  *  3/2013  ............. G16C 20/20
EP     2621089 A1     7/2013
(Continued)

OTHER PUBLICATIONS

International Search Report and Written Opinion issued in corresponding International Patent Application No. PCT/JP2017/041816, 6 pages (dated Jan. 19, 2018).

*Primary Examiner* — Tung S Lau
(74) *Attorney, Agent, or Firm* — Buchanan Ingersoll & Rooney PC

(57) ABSTRACT

A system for scanning a gas mixture using a sensor is disclosed. The system includes a matrix multiplication module configured to pre-multiply a B matrix with a diagonal matrix that is created with a vector of nominal concentration of the set of gases to obtain an adjusted B matrix (Ba) and a mass to charge ratio extraction module that is configured to select a set of mass to charge ratios for the set of gases to scan in a time budget based on the adjusted B matrix (Ba). The B matrix is a multiplication of P, T, C and R matrices, wherein P is a convolution matrix representing peak shapes, T is transmission efficiencies at each integral mass to charge ratio, R is relative ionization potentials for each gas and C is a reference spectrum representing idealized responses for each gas at the integral mass to charge ratio.

17 Claims, 12 Drawing Sheets

(56) References Cited

U.S. PATENT DOCUMENTS

| | | | | |
|---|---|---|---|---|
| 6,649,907 B2* | 11/2003 | Ebeling | | H01J 49/044 |
| | | | | 250/288 |
| 6,727,497 B2* | 4/2004 | Scalf | | H01J 49/165 |
| | | | | 250/282 |
| 6,765,199 B2* | 7/2004 | Youngquist | | H01J 49/0036 |
| | | | | 250/281 |
| 7,072,772 B2* | 7/2006 | Ahmed | | H01J 49/40 |
| | | | | 250/399 |
| 7,457,708 B2* | 11/2008 | Thompson | | G01N 30/72 |
| | | | | 702/19 |
| 8,017,908 B2* | 9/2011 | Gorenstein | | G01N 30/8675 |
| | | | | 250/282 |
| 8,480,110 B2* | 7/2013 | Gorenstein | | H01J 49/0036 |
| | | | | 280/282 |
| 9,337,009 B2* | 5/2016 | Grothe, Jr. | | H01J 49/429 |
| 9,666,422 B2 | 5/2017 | Murthy | | |
| 2005/0086017 A1* | 4/2005 | Wang | | H01J 49/0027 |
| | | | | 702/85 |
| 2005/0180233 A1* | 8/2005 | Das | | G11C 7/1063 |
| | | | | 365/202 |
| 2005/0255606 A1* | 11/2005 | Ahmed | | G06K 9/00503 |
| | | | | 436/173 |
| 2008/0052011 A1 | 2/2008 | Wang et al. | | |
| 2009/0152455 A1* | 6/2009 | Wang | | H01J 49/0027 |
| | | | | 250/252.1 |
| 2013/0035867 A1* | 2/2013 | De Moor | | G06K 9/38 |
| | | | | 702/19 |
| 2013/0080073 A1* | 3/2013 | de Corral | | H01J 49/0036 |
| | | | | 702/23 |
| 2014/0025342 A1* | 1/2014 | Gorenstein | | H01J 49/02 |
| | | | | 702/197 |
| 2014/0179020 A1* | 6/2014 | Wright | | G16C 20/20 |
| | | | | 436/173 |
| 2015/0144784 A1* | 5/2015 | Grothe, Jr. | | H01J 49/4215 |
| | | | | 250/290 |
| 2019/0221412 A1* | 7/2019 | Madathil | | G06F 16/901 |
| 2020/0286722 A1* | 9/2020 | Bern | | H01J 49/0036 |

FOREIGN PATENT DOCUMENTS

| | | |
|---|---|---|
| WO | 2006050226 A2 | 5/2006 |
| WO | 2014125819 A1 | 8/2014 |

* cited by examiner

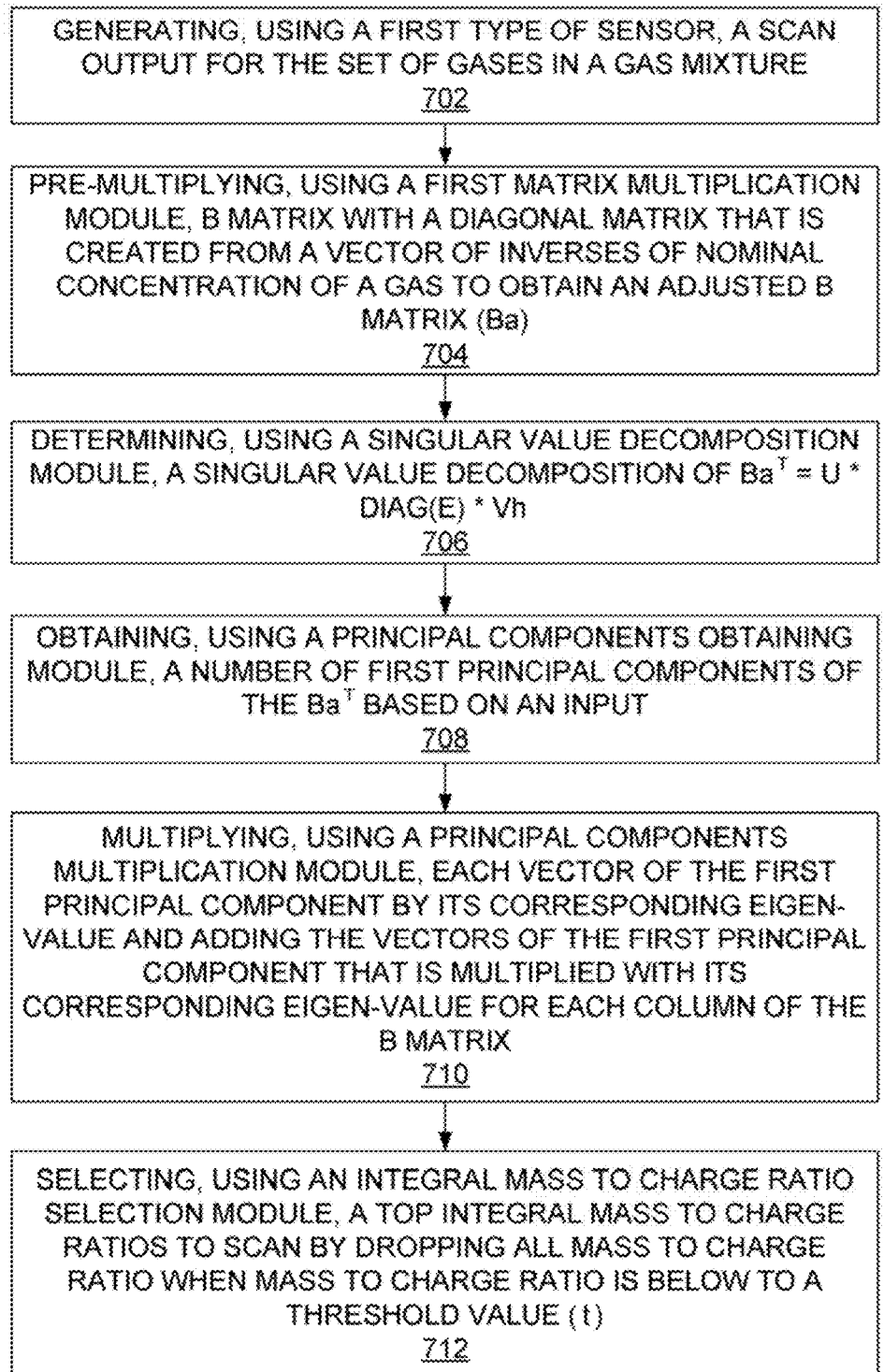

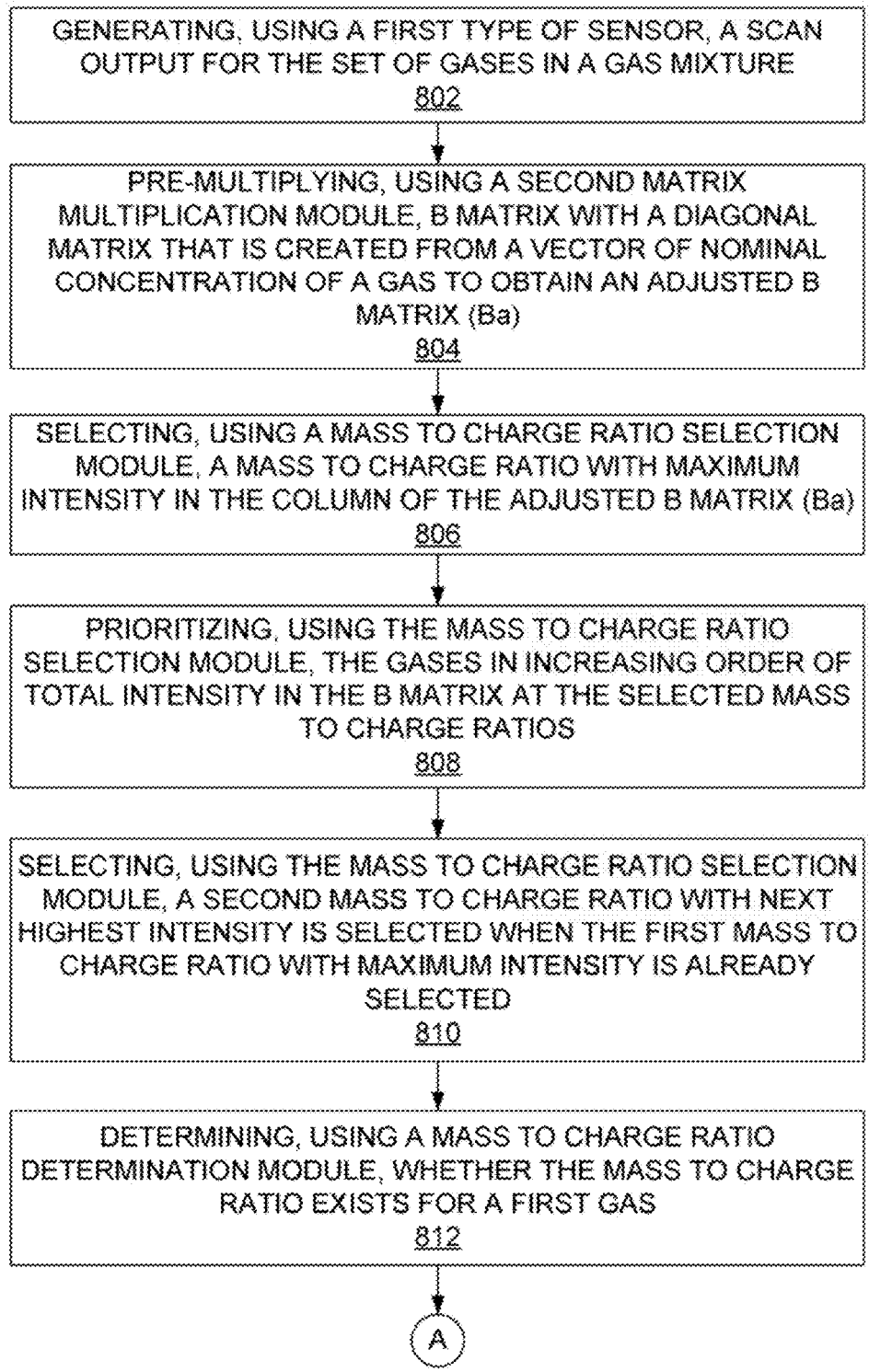

[Fig. 8B]
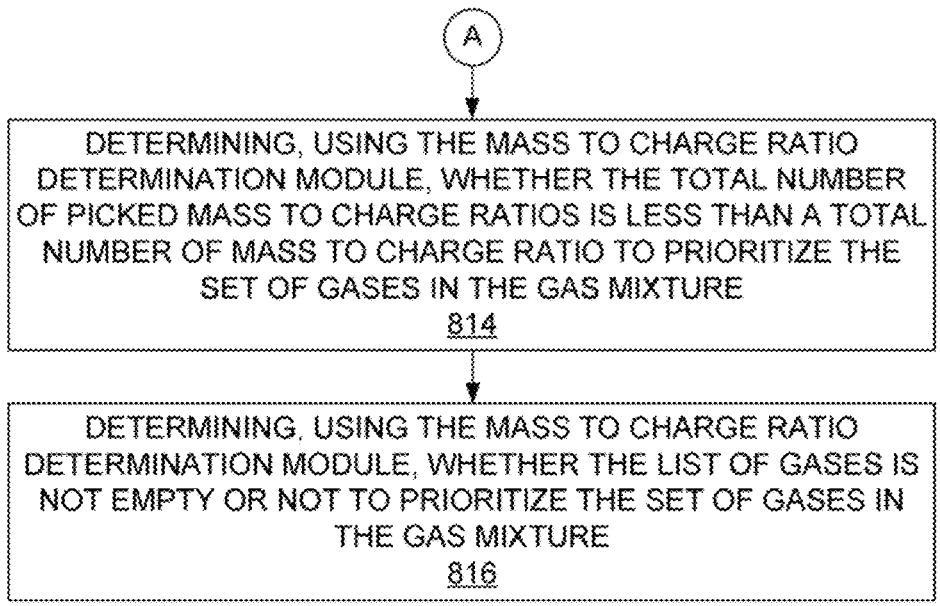

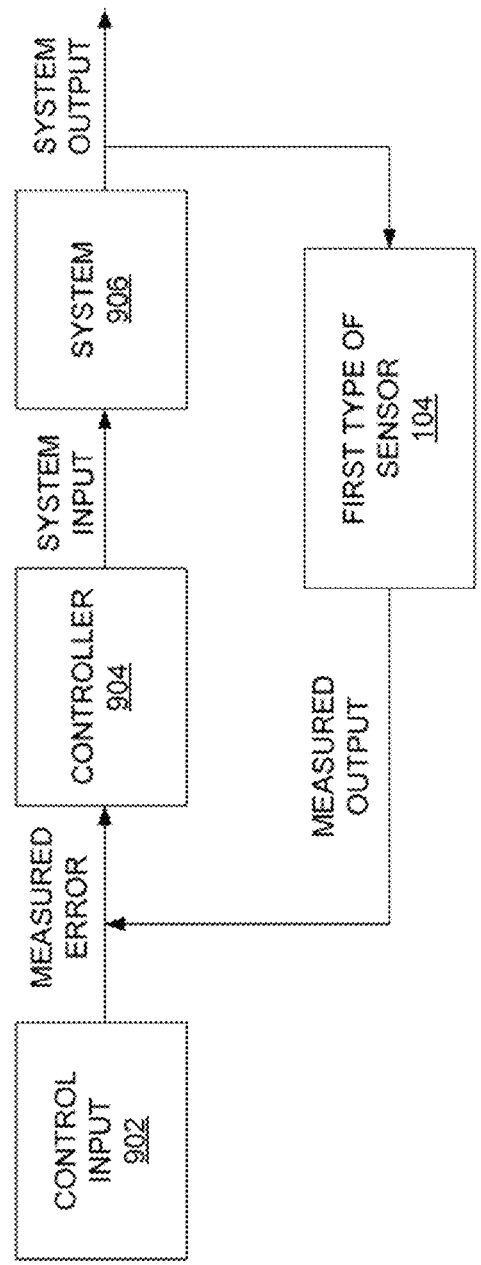

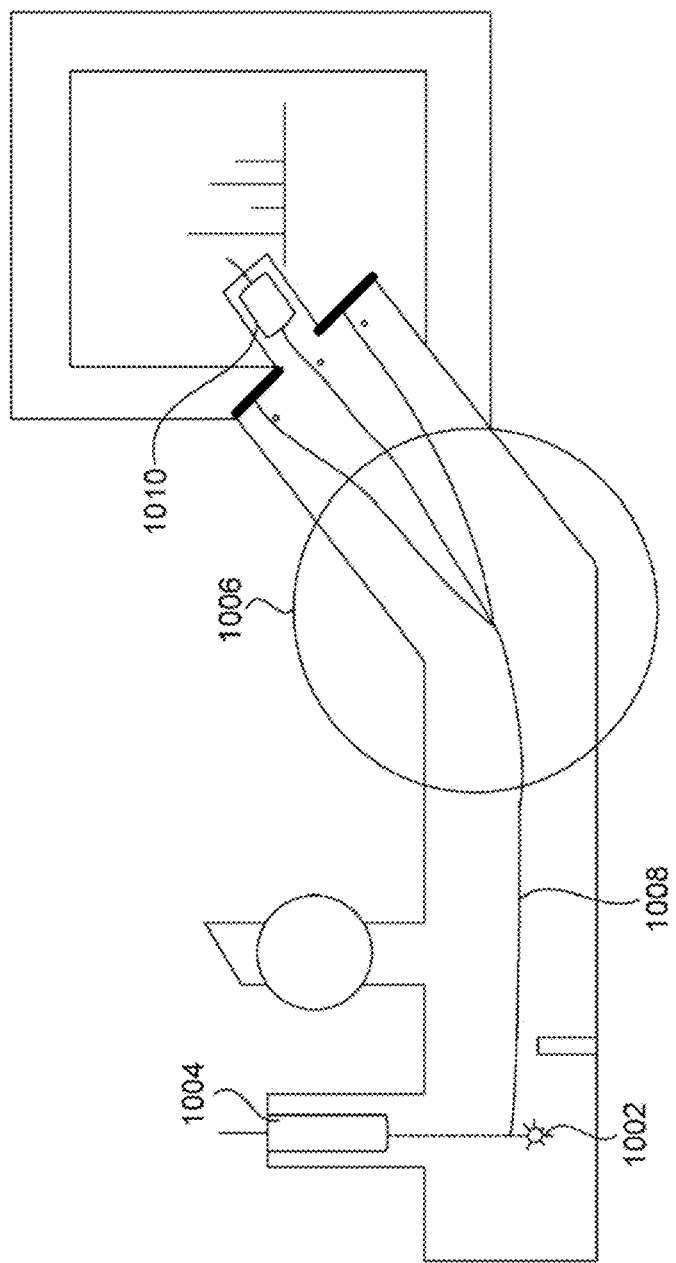

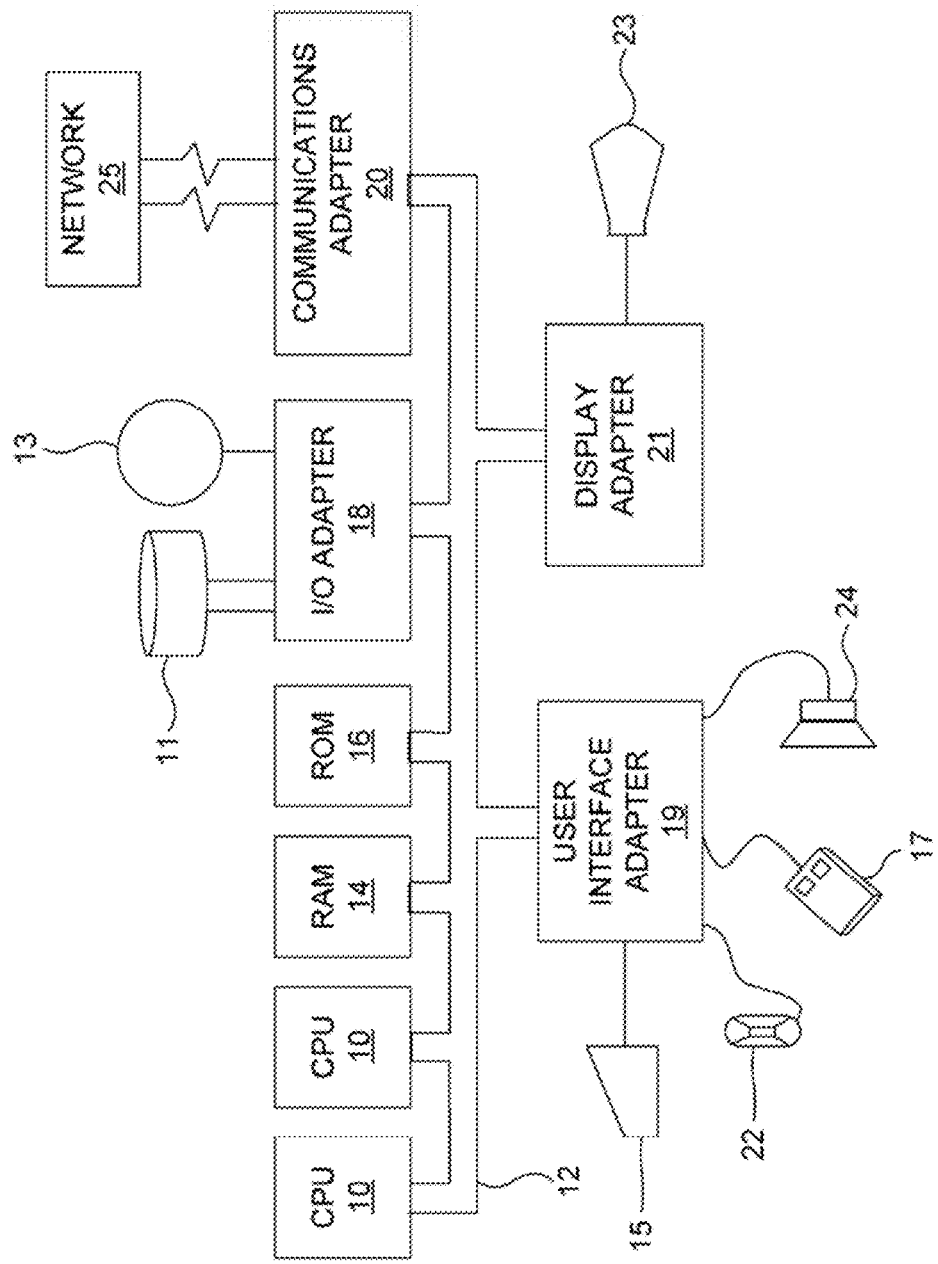

SYSTEM AND METHOD FOR DETERMINING SET OF MASS TO CHARGE RATIOS FOR SET OF GASES

TECHNICAL FIELD

The inventions generally relate to determining ion mass to charge ratios for a set of gases, and, more particularly, to a system and a method for determining an optimal set of mass to charge ratios for a set of gases to scan in response to a time budget.

BACKGROUND ART

In the past, it has been customary to manually obtain gas samples at the various sampling points and then to analyze the samples with a conventional analyzing apparatus. While this type of sampling and analyzing produces a highly accurate analysis of the gas at each sampling point, it is unsatisfactory due to the time consumed in manually scanning the various sampling points. In addition to the above problem, a conventional mass scanning method requires a very long time to analyze a whole range of all ion species, and an accuracy of using fixed mass to charge ratios per gas is poor. The traditional method of scanning a limited set of mass to charge ratios and applying non-negative least squares method with a subset of a B matrix, trading off accuracy for speed. Even though, the mass to charge ratios are determined to scan, the method is complicated since many gases need to be fragmented by non-trivial fragmentation patterns.

In many applications, a need for monitoring gas molecular fraction data at a high rate so as to be able to control, for example, an industrial process with a required accuracy and response time. A traditional method of full scan of mass to charge ratios of a set of gases takes too much time and also the traditional method of using fixed mass to charge ratios per gas is inaccurate.

Accordingly, there remains a need for a system and a method to overcome the aforementioned problems and drawbacks and enables determination of an optimal set of ion mass to charge ratios to scan in response to a time budget.

SUMMARY OF INVENTION

One of aspect of this invention is a system for scanning a gas mixture using a first type of sensor. The first type of sensor generates a scan output for a set of gases in the gas mixture. The scan output includes spectra of detected ions as a function of mass to charge ratio corresponding to the set of gases. The system includes a database and a set of module. The database stores standard reference data related to standard fragmentation and ionization potentials the set of gases. The set of modules includes a matrix multiplication module and a mass to charge ratio extraction module. The matrix multiplication module is configured to pre-multiply a B matrix with a diagonal matrix that is created with a vector of nominal concentration of the set of gases to obtain an adjusted B matrix (Ba). The B matrix is a multiplication of P, T, C and R matrices relating to the standard reference data. P is a convolution matrix representing peak shapes, T is transmission efficiencies at each integral mass to charge ratio (m/z), R is relative ionization potentials for each gas and C is a reference spectrum representing idealized responses for each gas at the integral mass to charge ratio. The diagonal matrix is a matrix in which the entries outside the main diagonal are all zero. The mass to charge ratio extraction module is configured to select a set of mass to charge ratios for the set of gases to scan in a time budget based on the adjusted B matrix (Ba).

The matrix multiplication module may include a first matrix multiplication module that is configured to pre-multiply the B matrix with a diagonal matrix that is created from a vector of inverses of the nominal concentration of the set of gases to obtain the adjusted B matrix (Ba). The mass to charge ratio extraction module may include a singular value decomposition module, a principal components obtaining module, a principal components multiplication module, and an integral mass to charge ratio selection module. The singular value decomposition module is configured to determine a singular value decomposition of $Ba^T = U*diag(E)*Vh$. The $Ba^T$ is a matrix transpose of the sub-matrix of the adjusted B matrix (Ba). The $U*diag(E)*Vh$ is the singular value decomposition (SVD) that is a factorization of a real or a complex matrix. The principal components obtaining module is configured to obtain a number of first principal components of the $Ba^T$ based on an input. The principal components multiplication module is configured to multiply each vector of the first principal component by its corresponding Eigen-value and adding the vectors of the first principal component that is multiplied with its corresponding Eigen-value for each column of the B matrix. The integral mass to charge ratio selection module that is configured to select a top integral mass to charge ratios to scan by dropping all mass to charge ratio when mass to charge ratio is below to a threshold value (t).

The mass to charge ratio extraction module may further include a mass to charge ratio dropping module that is configured to drop the mass to charge ratio that is below to the threshold value.

The integral mass to charge ratio selection module may be configured to select an increased number of mass to charge ratios when the number of principal components and the threshold value are increased.

The matrix multiplication module may include a second matrix multiplication module that is configured to pre-multiply the B matrix with a diagonal matrix that is created from a vector of the nominal concentration of the set of gases to obtain the adjusted B matrix (Ba). The mass to charge ratio extraction module may include a mass to charge ratio selection module and a mass to charge ratio determination module. The mass to charge ratio selection module is configured to (a) select a mass to charge ratio with maximum intensity in the column of the adjusted B matrix, (b) prioritize the gases in increasing order of total intensity in the B matrix at the selected mass to charge ratios and (c) select a second mass to charge ratio with next highest intensity that is selected when the first mass to charge ratio with maximum intensity is already selected. The mass to charge ratio determination module is configured to (a) determine whether the mass to charge ratio exists for a first gas and (b) determine whether the total number of picked mass to charge ratios is less than a total number of mass to charge ratio to prioritize a set of gases in the gas mixture. This system (mass spectrometer system) selects a mass to charge ratio one after another with non-conflicting information for a set of gases in a gas mixture in a time budget.

The mass to charge ratio determination module may be further configured to (c) add the mass to charge ratio to a list of mass to charge ratio when the mass to charge ratio exists for the first gas and (d) delete the first gas from list of gases of the gas mixture when the mass to charge ratio does not exist for the first gas.

The mass to charge ratio determination module may be further configured to (e) determine whether the list of gases is not empty or not to prioritize the set of gases in the gas mixture.

The set of modules may further include analyzing module that is configured to analyze the gas mixture based on the scan output that includes the set of mass to charge ratios selected. The system may further include a memory that stores the database and the set of modules, and a processor that executes the set of modules. The system may further include a first type of sensor.

Another aspect of this invention is a method implemented on a computer. The method includes selecting a set of mass to charge ratios of a gas mixture to scan using a first type of sensor. The first type of sensor generates a scan output for a set of gases in the gas mixture. The scan output includes spectra of detected ions as a function of mass to charge ratio corresponding to the set of gases. The selecting a set of mass to charge ratios includes following steps of (i) pre-multiplying, a B matrix with a diagonal matrix that is created with a vector of nominal concentration of the set of gases to obtain an adjusted B matrix (Ba) and (ii) extracting a set of mass to charge ratios for the set of gases to scan in a time budget based on the adjusted B matrix. The B matrix is a multiplication of P, T, C and R matrices. P is a convolution matrix representing peak shapes, T is transmission efficiencies at each integral mass to charge ratio (m/z), R is relative ionization potentials for each gas and C is a reference spectrum representing idealized responses for each gas at the integral mass to charge ratio.

The step of pre-multiplying may include a step of pre-multiplying the B matrix with a diagonal matrix that is created from a vector of inverses of the nominal concentration of the set of gases to obtain the adjusted B matrix (Ba). The step of extracting may include steps of (a) determining a singular value decomposition of $Ba^T=U*diag(E)*Vh$, (b) obtaining a number of first principal components of the $Ba^T$ based on an input (c) multiplying each vector of the first principal component by its corresponding Eigen-value and adding the vectors of the first principal component that is multiplied with its corresponding Eigen-value for each column of the B matrix and (d) selecting a top integral mass to charge ratios to scan by dropping all mass to charge ratio when mass to charge ratio is below to a threshold value. The $Ba^T$ is a matrix transpose of the sub-matrix of the adjusted B matrix (Ba). The $U*diag(E)*Vh$ is the singular value decomposition that is a factorization of a real or a complex matrix.

The step of extracting may further include a step of selecting an increased number of mass to charge ratios when the number of principal components and the threshold value are increased.

The step of pre-multiplying may include pre-multiplying, the B matrix with a diagonal matrix that is created from the vector of the nominal concentration of the set of gases to obtain the adjusted B matrix (Ba). The step of extracting may include, for selecting a mass to charge ratio one after another with non-conflicting information for the set of gases in the gas mixture, steps of (a) selecting a mass to charge ratio with maximum intensity in the column of the adjusted B matrix (Ba), (b) prioritizing the gases in increasing order of total intensity in the B matrix at the selected mass to charge ratios, (c) selecting a second mass to charge ratio with next highest intensity is selected when the first mass to charge ratio with maximum intensity is already selected, (d) determining whether the mass to charge ratio exists for a first gas, (e) determining whether the total number of picked mass to charge ratios is less than a total number of mass to charge ratio to prioritize the set of gases in the gas mixture and (f) determining whether the list of gases is not empty or not to prioritize the set of gases in the gas mixture.

The step of extracting may further include (g) adding the mass to charge ratio to a list of mass to charge ratio when the mass to charge ratio exists for the first gas and (h) deleting the first gas from a list of gases of the gas mixture when the mass to charge ratio does not exist for the first gas.

The method may further include a step of analyzing the gas mixture based on the scan output for the set of mass to charge ratios selected.

Yet another aspect of this invention is computer program (program product) that includes instructions for a computer to operate as the system described above. The program (program product) may be supplied stored in a memory medium.

The system is used to determine an optimal set of mass to charge ratios in response to a time budget. The system gets much faster performance than using a full scan. The system allows optimally determining peaks from a whole set of ions scanned where substantial information degradation due to peak overlap exists and the system suggests to add or alter the mass to charge ratios to scan. The system is used to trade-off accuracy for speed by varying the number of mass to charge ratios to be scanned. The system is used to produce as declining marginal utility function for the accuracy for each mass to charge ratio added to the mass to charge ratios list.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following detailed description with reference to the drawings, in which:

FIG. 7 is a flow diagram that illustrates a computer implemented method for selecting a set of mass to charge ratios for a set of gases in a gas mixture to scan of FIG. 1 according to an embodiment herein;

FIG. 8A is a flow diagram that illustrate a computer implemented method for selecting a mass to charge ratio one after another with non-conflicting information for a set of gases gas in a gas mixture according to an embodiment herein;

FIG. 8B is a flow diagram following FIG. 8A;

FIG. 9 is a block diagram that illustrates a control loop to scan mass to charge ratios in a time budget with high accuracy according to an embodiment herein;

FIG. 10 illustrates a perspective view of a first type of sensor (a mass spectrometer) according to an embodiment herein; and FIG. 11 illustrates a schematic diagram of computer architecture of a system in accordance with the embodiments herein.

DESCRIPTION OF EMBODIMENTS

Figure 1:
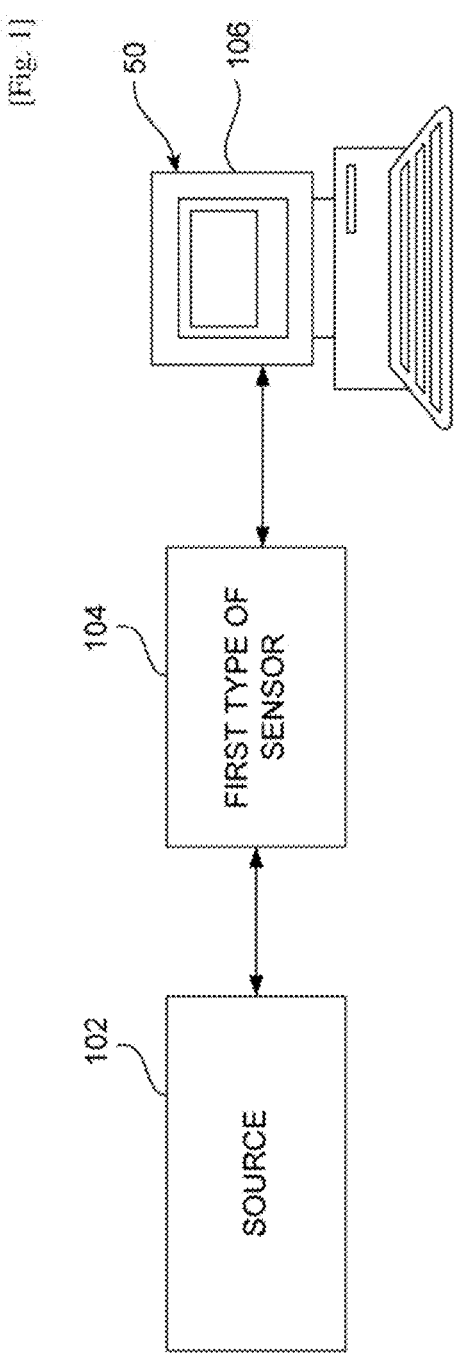
FIG. 1 illustrates a system that includes a system for selecting a set of mass to charge ratios for a set of gases in a gas mixture to scan according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved system and method for selecting mass to charge ratios to scan in a time budget. The embodiments herein achieve this by providing a system that includes a first mass to charge ratio extraction system that implements a first method to extract (i.e. selection of a set of mass to charge ratios) the set of mass to charge ratios for a set of gases gas in a gas mixture to scan. The embodiments herein achieve this by providing a system that includes a second mass to charge ratio extraction system that implements a second method to select mass to charge ratios one after another with non-conflicting information for a set of gases in the gas mixture to scan. Referring now to the drawings, and more particularly to FIGS. 1 through 11, where similar reference characters denote corresponding features consistently throughout the figures, preferred embodiments are shown.

FIG. 1 illustrates a system that includes a system for selecting a set of mass to charge ratios for a set of gases in a gas mixture to scan according to an embodiment herein. The system includes a source 102, a first type of sensor 104 and a system 50 for scanning the source 102. The system 50 may be a system for analyzing and/or monitoring the source 102. The system 50 includes a first mass to charge ratio extraction system 106. The source 102 includes a gas. The first mass to charge ratio extraction system 106 may be electrically connected to the first type of sensor 104. The first type of sensor 104 generates a scan output for the set of gases in the gas mixture. The scan output includes spectra of detected ions as a function of the mass-to-charge ratio corresponding to the set of gases. In an embodiment, the first type of sensor 104 includes a mass spectrometer sensor. In an embodiment, one example of the first type of sensor 104 is disclosed in the U.S. Pat. No. 9,666,422. The first mass to charge ratio extraction system 106 extracts a set of mass to charge ratio for a set of gases with a B matrix to scan, in response to a time budget. The B matrix is defined as a matrix multiplication of P, T, C and R matrices. The B matrix can be represented as $$B = P \times \text{diag}(T) \times C \times \text{diag}(R) \quad \text{[Math. 1]}$$

Where P is a convolution matrix representing peak shapes, T is transmission efficiencies at each integral mass to charge ratio (m/z),
R is relative ionization potentials for each gas, and
C is a reference spectrum representing idealized responses for each gas at the integral m/z value.

The first mass to charge ratio extraction system 106 pre-multiplies the B matrix with a diagonal matrix that is created from a vector of inverses of nominal concentration of the set of gases to obtain an adjusted B matrix (Ba). A diagonal matrix is a matrix in which the entries outside the main diagonal are all zero. The first mass to charge ratio extraction system 106 further normalizes current intensities across the expected nominal concentration of the set of gases in the gas mixture. In an embodiment, a sub-matrix of the adjusted B matrix (Ba) corresponding to integral mass to charge ratio for the set of gases may be used to normalize current intensities across the expected nominal concentration of the set of gases in the gas mixture.

The first mass to charge ratio extraction system 106 determines a singular value decomposition (SVD) of $Ba^T = U^* \text{diag}(E)^* Vh$. The diag(E) represents a diagonal matrix including Eigen-values of $Ba^T$. The $Ba^T$ is a matrix transpose of the sub-matrix of the adjusted B matrix (Ba). The matrix transpose of $Ba^T$ is needed as the B matrix is arranged with rows corresponding to mass to charge ratios and columns corresponding to gases. The $U^* \text{diag}(E)^* Vh$ is the singular value decomposition (SVD) that is a factorization of a real or a complex matrix. The SVD is a generalization of the Eigen-decomposition of a positive semi-definite normal matrix to any matrix (m×n) via an extension of polar decomposition. The first mass to charge ratio extraction system 106 obtains an input related to a number of principal components (n) and selects a first 'n' rows of diag(E)*Vh. The principal components are the coordinates of the observations in the orthonormal basis of the new variable which are linear combinations of input components with maximum covariance.

The first 'n' rows may include a number of first principal components of the $Ba^T$. The first mass to charge ratio extraction system 106 multiplies a vector of each of the first principal component by its corresponding Eigen-value (e.g. a diagonal element of diag(E) and sums the vectors). The term "Eigen-values" refers to a special set of scalars associated with a linear system of equations (i.e., a matrix equation). The Eigen-values are sometimes called as characteristic roots, characteristic values, proper values or latent roots. In an embodiment, each column corresponds to one mass to charge ratio. The first mass to charge ratio extraction system 106 weights the principal components that have greater Eigen-values higher. In an embodiment, the first mass to charge ratio extraction system 106 may reduce the vector that is in mass to charge ratio space (i.e. the vector that corresponds to most of the energy in the adjusted B matrix (Ba)) to a lower dimensional space. To regularize the vector, the first mass to charge ratio extraction system 106 drops mass to charge ratio (m/z) which is below to a threshold value (t) or selects a top 'm' mass to charge ratios to scan, wherein 'm' is a number of mass to charge ratios.

The system 50 and/or the first mass to charge ratio extraction system 106 may be a controller in a mass spectrometer or other instrument, a computer, a mobile phone, a PDA (Personal Digital Assistant), a tablet, an electronic notebook or a Smartphone. In an embodiment, the first type of sensor 104 may be embedded in or connected to the first mass to charge ratio extraction system 106. The first mass to charge ratio extraction system 106 may be a cloud server. In an embodiment, the first mass to charge ratio extraction system 106 is implemented in a field programmable gate array or any semiconductor device. In an embodiment, the first mass to charge ratio extraction system 106 may select an increased number of mass to charge ratios when there is an increase in the number of principal components (n) and the threshold value (t).

Figure 2:
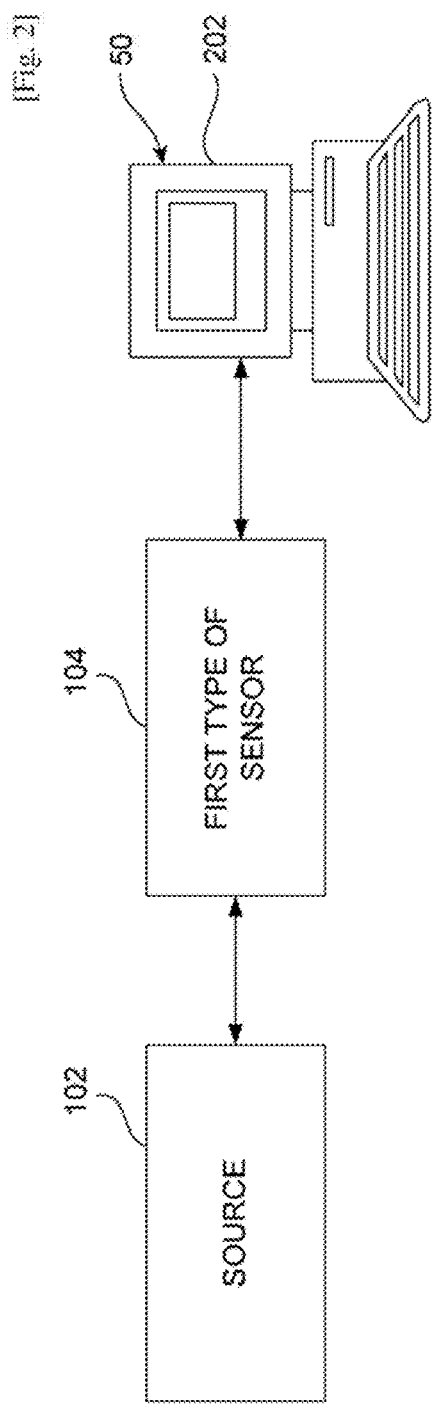
FIG. 2 illustrates a system that includes a system for selecting a mass to charge ratio one after another with non-conflicting information for a set of gases gas in a gas mixture according to an embodiment herein.

FIG. 2 illustrates a system that includes a system for selecting a mass to charge ratio one after another with non-conflicting information for a set of gases gas in a gas mixture according to an embodiment herein. The system includes the source 102, the first type of sensor 104 and a system 50 for scanning, analyzing or monitoring the source 102. The system 50 includes a second mass to charge ratio extraction system 202. The second mass to charge ratio extraction system 202 may be electrically connected to the first type of sensor 104. The second mass to charge ratio extraction system 202 pre-multiplies the B matrix with a diagonal matrix that is created from a vector of nominal concentration of the set of gases to obtain an adjusted B matrix (Ba).

To scan a number of mass to charge ratio (m), the second mass to charge ratio extraction system 202 selects a first mass to charge ratio with maximum intensity in the column of the adjusted B matrix (Ba) for the set of gases in the gas mixture. The gas mixture may include 'g' gases. The second mass to charge ratio extraction system 202 may select a second mass to charge ratio with next highest intensity if the first mass to charge ratio with maximum intensity is already selected. Similarly, the second mass to charge ratio extraction system 202 may select subsequent mass to charge ratio with subsequent highest intensity. The second mass to charge ratio extraction system 202 may arrange/prioritize the gases in increasing order of the total intensity at the selected mass to charge ratios. The second mass to charge ratio extraction system 202 further selects a mass to charge ratio corresponding to highest intensity in the column of the adjusted B matrix (Ba) for a first gas in the gas mixture if the first gas is not already selected. The second mass to charge ratio extraction system 202 further determines whether the mass to charge ratio for the first gas exists.

If the mass to charge ratio for the first gas exists, the second mass to charge ratio extraction system 202 adds the mass to charge ratio to a list of mass to charge ratio to update the total intensity of the first gas and to increment the total number of picked mass to charge ratios. The second mass to charge ratio extraction system 202 determines whether the total number of picked mass to charge ratios is less than the number of mass to charge ratio (m) to scan. If the total number of picked mass to charge ratios is less than the number of mass to charge ratio (m) to scan, the second mass to charge ratio extraction system 202 then arranges/prioritizes the gases in increasing order of total intensity at the selected mass to charge ratios. The second mass to charge ratio extraction system 202 determines whether a mass to charge ratio is not already selected for the first gas. If the mass to charge ratio is not already selected for the first gas, the second mass to charge ratio extraction system 202 deletes the first gas from list of 'g' gases. The second mass to charge ratio extraction system 202 determines whether the list of 'g' gases is not empty or not. If the list of 'g' gases is not empty, the second mass to charge ratio extraction system 202 arranges/prioritizes the gases in increasing order of the total intensity at the selected mass to charge ratios.

The second mass to charge ratio extraction system 202 may be a cloud server. In an embodiment, the second mass to charge ratio extraction system 202 may be implemented in a field programmable gate array or any semiconductor device. The second mass to charge ratio extraction system 202 may be a controller, a computer, a mobile phone, a PDA (Personal Digital Assistant), a tablet, an electronic notebook, a Smartphone or a cloud service. In an embodiment, the first type of sensor 104 may be embedded in the second mass to charge ratio extraction system 202.

Figure 3:
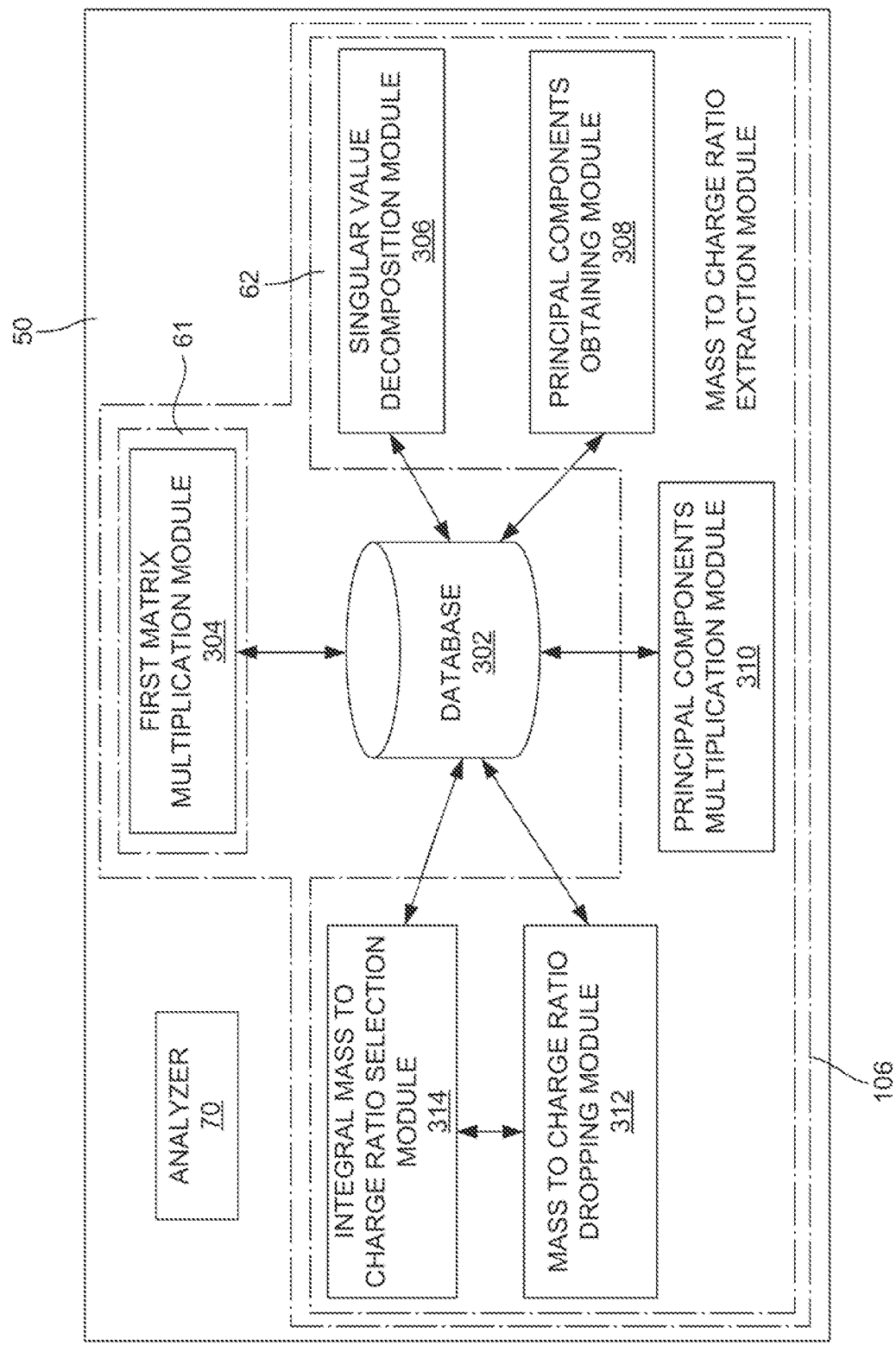
FIG. 3 illustrates an exploded view of the system of FIG. 1 according to an embodiment herein.

FIG. 3 illustrates an exploded view of the system 50 that includes the first mass to charge ratio extraction system 106 of FIG. 1 for selecting a set of mass to charge ratios for a set of gases of source 102 to scan in a time budget according to an embodiment herein. The system 50 may be an analyzing system or a mass spectrometer system. The system 50 may include a memory unit and a processor (specialized mass to charge ratio extraction processor). The memory unit includes a database 302 and a set of modules of the system 50. The database 302 stores data related to standard fragmentation and ionization potentials for the set of gases. The specialized processor executes the set of modules that include a matrix multiplication module 61 and a mass to charge ratio extraction module 62 for the first mass to charge ration extraction system 106 and an analyzer module 70. The matrix multiplication module 61 obtains an adjusted B matrix (Ba) and includes a first matrix multiplication module 304. The mass to charge ratio extraction module 62 selects a set of mass to charge ratios for the set of gases to scan in a time budget based on the adjusted B matrix and includes a singular value decomposition module 306, a principal components obtaining module 308, a principal components multiplication module 310, a mass to charge ratio dropping module 312 and an integral mass to charge ratio selection module 314.

The first matrix multiplication module 304 pre-multiplies with a B matrix with a diagonal matrix that is created from a vector of inverses of nominal concentration of the set of gases to obtain an adjusted B matrix (Ba). In an embodiment, the first matrix multiplication module 304 normalizes current intensities across the expected nominal concentration of the set of gases in the gas mixture. In an embodiment, a sub-matrix of the adjusted B matrix (Ba) corresponding to integral mass to charge ratio for the set of gases may be used to normalize current intensities across the expected nominal concentration of the set of gases in the gas mixture.

The singular value decomposition module 306 determines a singular value decomposition (SVD) of $Ba^T = U*diag(E)*Vh$. The diag(E) represents a diagonal matrix including Eigen-values of $Ba^T$. The $Ba^T$ is a matrix transpose of the sub-matrix of the adjusted B matrix (Ba). The matrix transpose of $Ba^T$ is needed as the B matrix is arranged with rows corresponding to mass to charge ratios and columns corresponding to gases. The principal components obtaining module 308 obtains an input related to a number of principal components (n) and selects a first 'n' rows of diag(E)*Vh. The first 'n' rows may include a number of first principal components of the BaT. The principal components multiplication module 310 multiplies a vector of each of the first principal component by its corresponding Eigen-value (e.g. a diagonal element of diag(E) and sums the vectors of the first principal component that is multiplied with its corresponding Eigen-value for each column of the B matrix).

In an embodiment, the principal components multiplication module 310 may weigh the principal components that have greater Eigen-values higher. The mass to charge ratio dropping module 312 drops mass to charge ratio (m/z) which is below to a threshold value (t). The integral mass to charge ratio selection module 314 selects a top 'm' mass to charge ratios to scan by dropping all mass to charge ratio when mass to charge ratio is below to the threshold value (t). The 'm' is a number of mass to charge ratios. In an embodiment, the integral mass to charge ratio selection module 314 may select an increased number of mass to charge ratios when the number of principal components (n) and the threshold value (t) are increased.

The first mass to charge ration extraction system 106, for instance, the mass to charge ratio extraction module 62 may control the first type of sensor 104 to generate or output the scan output that includes the selected set of mass to charge ratios to scan the gas mixture of the source 102 in a time budget. The first mass to charge ration extraction system 106, for instance, the mass to charge ratio extraction module 62 may output the scan output of the first type sensor 104 that includes the selected set of mass to charge ratios. The analyzer (analyzing module) 70 analyzes or monitors the gas mixture continuously or intermittently based on the scan output generated by the first type of sensor 104 that includes the set of mass to charge ratios selected by the first mass to charge ration extraction system 106.

Figure 4:
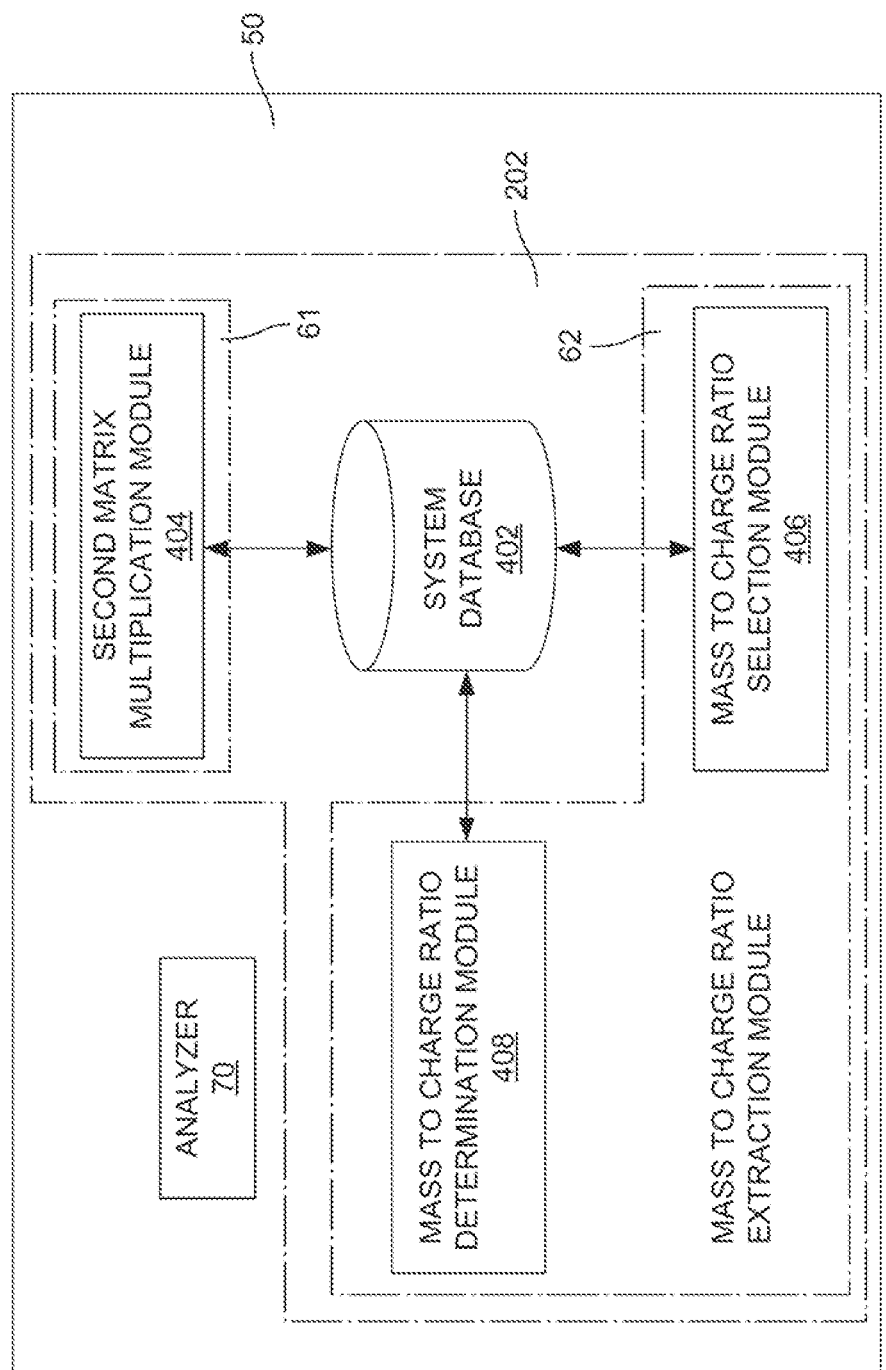
FIG. 4 illustrates an exploded view of the system of FIG. 2 according to an embodiment herein.

FIG. 4 illustrates an exploded view of the system 50 that includes the second mass to charge ratio extraction system 202 of FIG. 2 for selecting a mass to charge ratio one after another with non-conflicting information for a set of gases in a gas mixture of source 102 in a time budget according to an embodiment herein. The system 50 and the second mass to charge ratio extraction system 202 may be a mass spectrometer system, an analyzer or other general or special instrument. The system may include a memory unit and a processor (specialized mass to charge ratio extraction processor). The memory unit includes a system database 402 and a set of modules. The system database 402 stores data related to standard fragmentation and ionization potentials for the set of gases. The processor executes the set of modules that include a matrix multiplication module 61 and a mass to charge ration extraction module 62 for the second mass to charge ration extraction system 202 and an analyzer module 70. The matrix multiplication module 61 obtains an adjusted B matrix (Ba) and includes a second matrix multiplication module 404. The mass to charge ratio extraction module 62 selects a set of mass to charge ratios for the set of gases to scan in a time budget based on the adjusted B matrix and includes a mass to charge ratio selection module 406 and a mass to charge ratio determination module 408.

The second matrix multiplication module 404 pre-multiplies the B matrix with a diagonal matrix that is created from a vector of nominal concentration of the set of gases to obtain an adjusted B matrix (Ba).

The mass to charge ratio selection module 406 selects a first mass to charge ratio with maximum intensity in the column of the adjusted B matrix (Ba) for the set of gases in the gas mixture. The gas mixture may include 'g' gases. The mass to charge ratio selection module 406 may select a second mass to charge ratio with next highest intensity when the first mass to charge ratio with maximum intensity is already selected. Similarly, the mass to charge ratio selection module 406 may select subsequent mass to charge ratio with subsequent highest intensity. The mass to charge ratio selection module 406 may arrange/prioritize the gases in increasing order of the total intensity at the selected mass to charge ratios. The mass to charge ratio selection module 406 further selects a mass to charge ratio corresponding to highest intensity in the column of the adjusted B matrix (Ba) matrix for a first gas in the gas mixture if the first gas is not already selected.

The mass to charge ratio determination module 408 further determines whether the mass to charge ratio for the first gas exists. When the mass to charge ratio for the first gas exists, the mass to charge ratio determination module 408 adds the mass to charge ratio to a list of mass to charge ratio to update the total intensity of the first gas and to increment the total number of picked mass to charge ratios. The mass to charge ratio determination module 408 determines whether the total number of picked mass to charge ratios is less than the number of mass to charge ratio (m) to scan. When the total number of picked mass to charge ratios is less than the number of mass to charge ratio (m) to scan, the mass to charge ratio determination module 408 then arranges/prioritizes the gases in increasing order of total intensity at the selected mass to charge ratios. The mass to charge ratio determination module 408 determines whether a mass to charge ratio exists for the first gas. If no mass to charge ratio exists for the first gas, the mass to charge ratio determination module 408 then deletes the first gas from list of 'g' gases. The mass to charge ratio determination module 408 determines whether the list of 'g' gases is not empty or not. If the list of 'g' gases is not empty, the second mass to charge ratio extraction system 202 arranges/prioritizes the gases in increasing order of the total intensity at the selected mass to charge ratios.

The second mass to charge ration extraction system 202 may also control the first type of sensor 104 to generate or output the scan output that includes the selected set of mass to charge ratios to scan the gas mixture of the source 102 in a time budget. The second mass to charge ration extraction system 202 may output the scan output of the first type sensor 104 that includes the selected set of mass to charge ratios. The analyzing module 70 analyzes or monitors the gas mixture based on the scan output that includes the set of mass to charge ratios selected by the second mass to charge ration extraction system 202.

Figure 5:
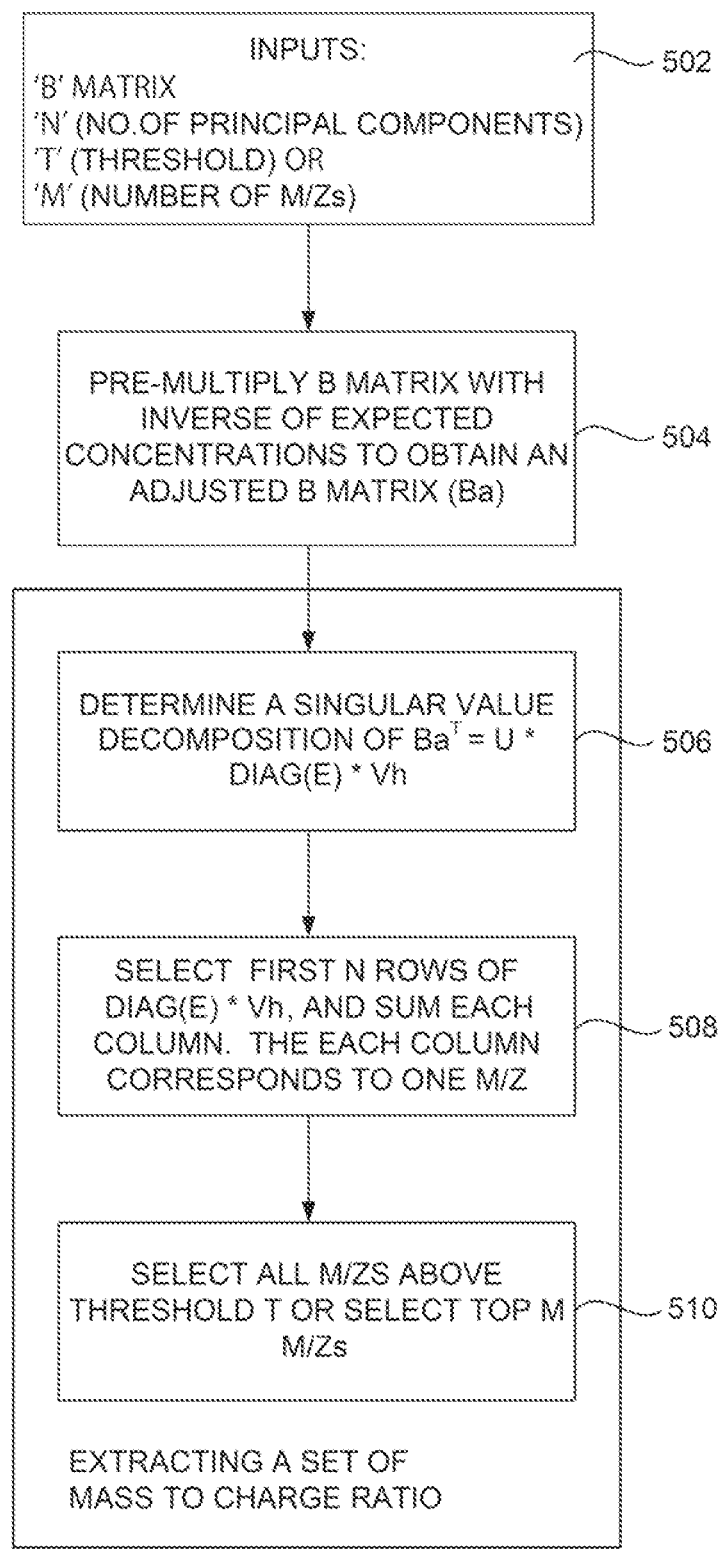
FIG. 5 is a flow diagram that illustrates a process for selecting a set of mass to charge ratios to scan for a set of gases in a gas mixture according to an embodiment herein.

FIG. 5 is a flow diagram that illustrates a process for selecting a set of mass to charge ratios for a set of gases in a gas mixture according to an embodiment herein. At step 502, inputs that include a B matrix, a number of principal components (n), a threshold value (t) or a number of mass to charge ratios (m) are obtained. At step 504, the B matrix is pre-multiplied with a diagonal matrix that is created from a vector of inverses of nominal concentration of the set of gases to obtain an adjusted B matrix (Ba). At step 506, a singular value decomposition (SVD) of $Ba^T = U*diag(E)*Vh$ is determined. At step 508, an input related to a number of principal components (n) is obtained to select a first 'n' rows of $diag(E)*Vh$. A vector of each of the first principal component is multiplied by its corresponding Eigen-value (e.g. a diagonal element of $diag(E)$). Vectors of the first principal component that is multiplied with its corresponding Eigen-value is added for each column. At step 510, a top integral mass to charge ratios that is above a threshold value 't' are selected by dropping mass to charge ratio (m/z) that is below to the threshold value (t).

Figure 6:
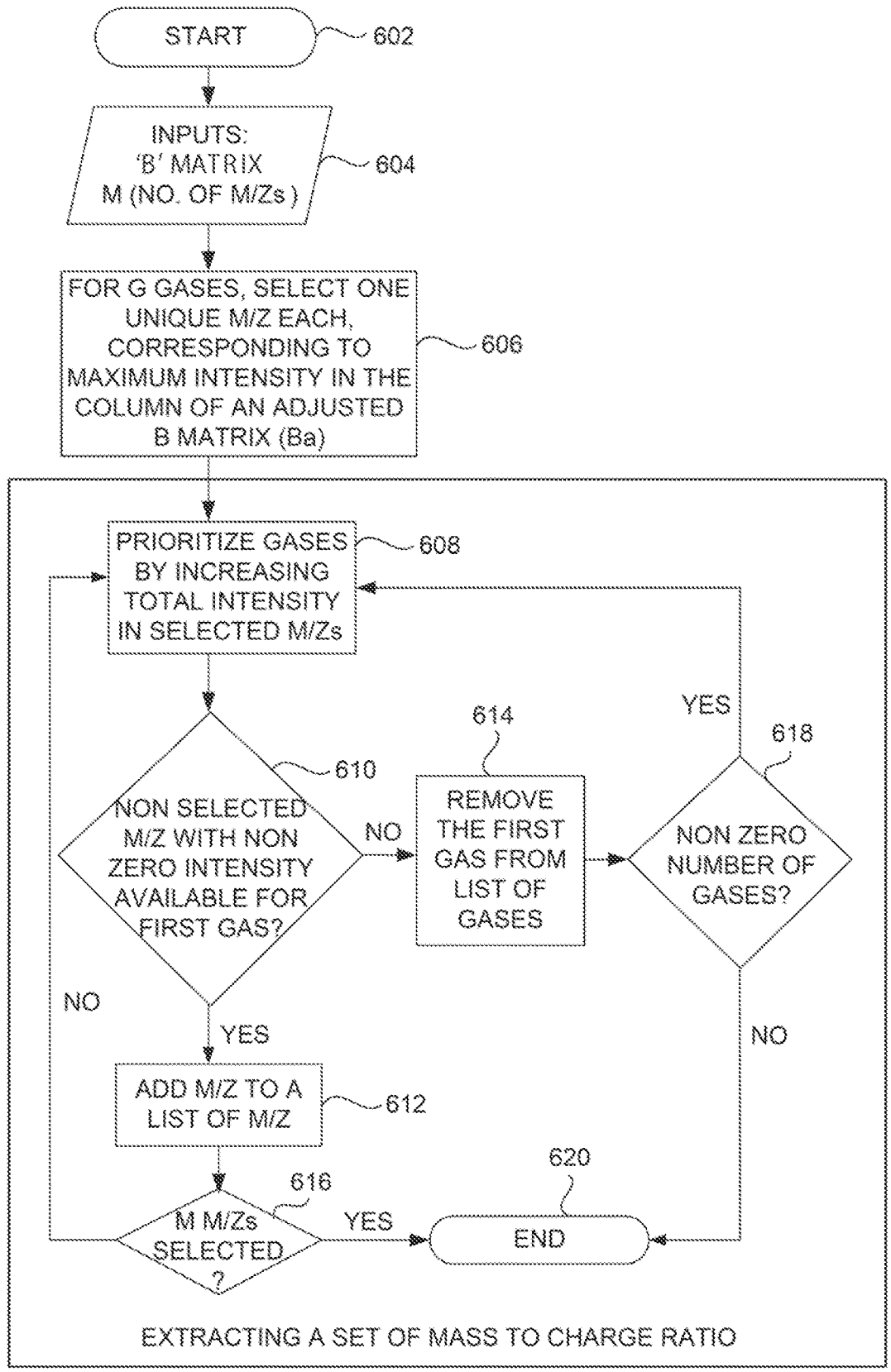
FIG. 6 is a flow diagram that illustrates a process for selecting a mass to charge ratios to scan one after another with non-conflicting information for a set of gases in a gas mixture according to an embodiment herein.

FIG. 6 is a flow diagram that illustrates a process for selecting mass to charge ratios one after another with non-conflicting information for a set of gases to scan according to an embodiment herein. The process starts at step 602. At step 604, inputs that include a B matrix, and a number of mass to charge ratios (m) are obtained. At step 606, a first mass to charge ratio (m/z) with maximum intensity in the column of the adjusted B matrix (Ba) for the set of gases in the gas mixture is selected. In an embodiment, a second mass to charge ratio (m/z) with next highest intensity is selected if the first mass to charge ratio with maximum intensity is already selected. At step 608, the gases are arranged/prioritized in increasing order of total intensity at the selected mass to charge ratios.

At step 610, it is determined whether the mass to charge ratio for a first gas exists. When the mass to charge ratio for the first gas exists, the mass to charge ratio is added to a list of mass to charge ratio to update the total intensity of the first gas and to increment the total number of picked mass to charge ratios, at step 612. When the mass to charge ratio for the first gas does not exist, the first gas is deleted from list of 'g' gases, at step 614. At step 616, it is determined whether the total number of picked mass to charge ratios is less than the number of mass to charge ratio (m) to scan. When the total number of picked mass to charge ratios is less than the number of mass to charge ratio (m) to scan, the gases are arranged/prioritized in increasing order of total intensity at the selected mass to charge ratios. When the total number of picked mass to charge ratios is not less than the number of mass to charge ratio (m), the process ends at step 620. At step 618, it is determined whether the list of 'g' gases is not empty or not. When the list of 'g' gases is not empty, the system 202 arranges/prioritizes the gases in increasing order of total intensity at the selected mass to charge ratios. When the gases are not available in the list of gases, then the process ends at step 620.

FIG. 7 is a flow diagram that illustrates a computer implemented method that includes selecting a set of mass to charge ratios for a set of gases in a gas mixture to scan of FIG. 1 according to an embodiment herein. At step 702, the scan output is generated for the set of gases in the gas mixture using the first type of sensor 104. The scan output includes spectra of detected ions as a function of the mass-to-charge ratio corresponding to the set of gases. At step 704, a B matrix is pre-multiplied with a diagonal matrix that is created from a vector of inverses of nominal concentration of a gas to obtain an adjusted B matrix (Ba) using a first matrix multiplication module 304. At step 706, a singular value decomposition of $Ba^T=U*diag(E)*Vh$ is determined using a singular value decomposition module 306. The $Ba^T$ is a matrix transpose of the sub-matrix of the adjusted B matrix (Ba). The $U*diag(E)*Vh$ is the singular value decomposition (SVD) that is a factorization of a real or a complex matrix.

At step 708, a number of first principal components of the $Ba^T$ is obtained using the principal components obtaining module 308 based on an input. At step 710, each vector of the first principal component is multiplied by its corresponding Eigen-value and adding the vectors of the first principal component that is multiplied with its corresponding Eigen-value for each column of the B matrix using the principal components multiplication module 310. At step 712, a top integral mass to charge ratios is selected to scan by dropping all mass to charge ratio when mass to charge ratio is below to a threshold value (t) using the integral mass to charge ratio selection module 314. In an embodiment, the mass to charge ratio is dropped using the mass to charge ratio dropping module 312 when the mass to charge ratio (m/z) is below to the threshold value (t).

FIGS. 8A-8B are flow diagrams that illustrate a computer implemented method for selecting a mass to charge ratio one after another with non-conflicting information for a set of gases gas in a gas mixture according to an embodiment herein. At step 802, the scan output is generated for the set of gases in the gas mixture using the first type of sensor 104. At step 804, a B matrix is pre-multiplied with a diagonal matrix that is created from a vector of nominal concentration of a gas to obtain an adjusted B matrix (Ba) using the second matrix multiplication module 404. At step 806, a mass to charge ratio is selected with maximum intensity in the column of the adjusted B matrix (Ba) using the mass to charge ratio selection module 406. At step 808, the gases are prioritized in increasing order of total intensity in the B matrix at the selected mass to charge ratios using the mass to charge ratio selection module 406. At step 810, a second mass to charge ratio is selected with next highest intensity is selected when the first mass to charge ratio with maximum intensity is already selected using the mass to charge ratio selection module 406. At step 812, it determines whether the mass to charge ratio exists for a first gas using the mass to charge ratio determination module 408.

At step 814, it determines whether the total number of picked mass to charge ratios is less than a total number of mass to charge ratio to prioritize a set of gases in the gas mixture using the mass to charge ratio determination module 408. At step 816, it determines whether the list of gases is not empty or not to prioritize the set of gases in the gas mixture using the mass to charge ratio determination module 408. In an embodiment, the mass to charge ratio is added to a list of mass to charge ratio when the mass to charge ratio exists for the first gas using the mass to charge ratio determination module 408. In another embodiment, the first gas is deleted from a list of gases of the gas mixture when the mass to charge ratio does not exist for the first gas using the mass to charge ratio determination module 408.

FIG. 9 is a block diagram that illustrates a control loop to scan mass to charge ratios in a time budget with high accuracy according to an embodiment herein. The block diagram includes a control input 902 (e.g. a reference gas samples), a controller 904, a system 906 and a first type of sensor 104. The controller 904 may be electrically connected to the system 906. The controller 904 may obtain a set of gases and controls the set of gases with a high accuracy, stability within a time budget. The mass to charge ratios for a set of gases are scanned within a given time budget using the first type of sensor 104 that is integrated with the system 906 in the control loop. In an embodiment, the mass to charge ratios for the set of gases are scanned in the time budget based on an accuracy of the first type of sensor 104. In an embodiment, a set of mass to charge ratios are selected/extracted to scan with the accuracy and the time budget (i.e. a response time to scan the mass to charge ratios) using a method as disclosed in FIG. 5. In another embodiment, a set of mass to charge ratios are selected to scan one after another with non-conflicting information for a set of gases with the accuracy and the time budget (i.e. a response time to scan the mass to charge ratios) using a method as disclosed in FIG. 6.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 10 illustrates a perspective view of a first type of sensor 104 (a mass spectrometer) according to an embodiment herein. The first type of sensor 104 includes a set of gases 1002, an electron gun 1004, an electric magnet 1006, an ion beam 1008 and an ion detector 1010. The set of gases 1002 to be ionized is obtained from the source 102. The electron gun 1004 ionizes particles in the set of gases 1002 by adding or removing electrons from the ionized particles. The electron gun 1004 ionizes vaporized or gaseous particles using electron ionization process. The electric magnet 1006 in the first type of sensor 104 produces electric or magnetic fields to measure the mass (i.e. weight) of charged particles. The magnetic field separates the ions according to their momentum (i.e. how the force exerted by the magnetic field can be used to separate ions according to their mass). The separated ion is targeted through a mass analyzer and onto the ion detector 1010. In an embodiment, differences in masses of the fragments allow the mass analyzer to sort the ions using their mass-to-charge ratio. The ion detector 1010 measures a value of an indicator quantity and thus provides data for calculating the abundances of each ion present in the set of gases 1002. The ion detector 1010 records either the charge induced or the current produced when the ion passes by or hits a surface. In an embodiment, the mass spectrum is displayed in the first mass to charge ratio extraction system 106 or in the second mass to charge ratio extraction system 202.

A representative hardware environment for practicing the embodiments herein is depicted in FIG. 11. This schematic drawing illustrates a hardware configuration of the first mass to charge ratio extraction system 106/the second mass to charge ratio extraction system 202 in accordance with the embodiments herein. The mass to charge ratio extraction system (106, 202) comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The mass to charge ratio extraction system (106, 202) comprises can read the inventive instructions on the program storage devices and follow these instructions to execute the methodology of the embodiments herein.

The mass to charge ratio extraction system (106, 202) further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Examples

The first mass to charge ratio extraction system 106 obtains three gas samples (e.g. gas 0, gas 1 and gas 2) and 10 mass to charge ratios (m/zs) totally (e.g. 1 m/z to 10 m/z) with a B matrix as given below:

$$B = \begin{pmatrix} 0.25 & 0.0 & 0.0 \\ 0.25 & 0.2 & 0.0 \\ 0.0 & 0.0 & 0.0 \\ 0.5 & 0.6 & 0.15 \\ 0.0 & 0.0 & 0.0 \\ 0.0 & 0.0 & 0.7 \\ 0.0 & 0.0 & 0.0 \\ 0.0 & 0.2 & 0.0 \\ 0.0 & 0.0 & 0.0 \\ 0.0 & 0.0 & 0.15 \end{pmatrix} \quad \text{[Math. 2]}$$

Where P matrix (a convolution matrix representing peak shapes), T matrix (transmission efficiencies at each integral m/z), and R matrix (relative ionization potentials for each gas) are identity matrices (i.e. diagonal matrices with 1 on the diagonal). C matrix (a reference spectrum representing idealized responses for each gas at the integral m/z value) is the same matrix as the B matrix.

The first mass to charge ratio extraction system 106 assumes a time budget that allows to scan three mass to charge ratios with the nominal concentrations of $$m = \begin{pmatrix} 0.8 \\ 0.1 \\ 0.1 \end{pmatrix} \quad \text{[Math. 3]}$$

In an embodiment, the first mass to charge ratio extraction system 106 represents the spectrometer output corresponding to the mass to charge ratios in a vector as given below:

$$y = \begin{pmatrix} 0.2 \\ 0.22 \\ 0.0 \\ 0.475 \\ 0.0 \\ 0.07 \\ 0.0 \\ 0.02 \\ 0.0 \\ 0.015 \end{pmatrix} \quad \text{[Math. 4]}$$

The first mass to charge ratio extraction system 106 applies a pre-multiplication technique (the pre-multiplication of the B matrix with the diagonal matrix to obtain an adjusted B matrix (Ba) as described in the FIG. 1) on the three gas samples to obtain the scaled B matrix as given below:

$$Ba = \begin{pmatrix} 0.3125 & 0.0 & 0.0 \\ 0.3125 & 2.0 & 0.0 \\ 0.0 & 0.0 & 0.0 \\ 0.625 & 6.0 & 1.5 \\ 0.0 & 0.0 & 0.0 \\ 0.0 & 0.0 & 7.0 \\ 0.0 & 0.0 & 0.0 \\ 0.0 & 2.0 & 0.0 \\ 0.0 & 0.0 & 0.0 \\ 0.0 & 0.0 & 1.5 \end{pmatrix} \quad \text{[Math. 5]}$$

The first mass to charge ratio extraction system 106 applies the method as described in FIG. 5 to obtain a following ranking weights for mass to charge ratios of the three gas samples as given below:

$$r1 = \begin{pmatrix} 0.353669396009 \\ 2.89436912317 \\ 0.0 \\ 8.81635173808 \\ 0.0 \\ 9.6392703977 \\ 0.0 \\ 2.93718910979 \\ 0.0 \\ 2.06555801567 \end{pmatrix} \quad \text{[Math. 6]}$$

The first mass to charge ratio extraction system 106 may select 6th, 4th and 8th mass to charge ratios, which are a feasible set of mass to charge ratios to compute a composition of the three gases. In an embodiment, the 4th mass to charge ratio is selected in spite of the contribution of the three gases.

In an embodiment, the second mass to charge ratio extraction system 202 applies the method as described in FIG. 6 to obtain the adjusted B matrix (Ba) as given below:

$$Ba = \begin{pmatrix} 0.2 & 0.0 & 0.0 \\ 0.2 & 0.02 & 0.0 \\ 0.0 & 0.0 & 0.0 \\ 0.4 & 0.06 & 0.015 \\ 0.0 & 0.0 & 0.0 \\ 0.0 & 0.0 & 0.07 \\ 0.0 & 0.0 & 0.0 \\ 0.0 & 0.02 & 0.0 \\ 0.0 & 0.0 & 0.0 \\ 0.0 & 0.0 & 0.015 \end{pmatrix} \quad \text{[Math. 7]}$$

Using the method as described in FIG. 6, the second mass to charge ratio extraction system 202 may select a mass to charge ratio in the following order i.e. 4th, 6th and 8th, which may lead to the same result.

A table that compares the mass to charge ratios that are selected by Greedy method (i.e. the greedy method that picks the mass to charge ratios with the most signal strength in the vector 'y'), the method as described in FIG. 5, the method as described in FIG. 6 for various time budgets as follows.

TABLE 1

| | 3 m/zs | 4 m/zs | 5 m/zs |
|---|---|---|---|
| Greedy method | 4, 2, 1 | 4, 2, 1, 6 | 4, 2, 1, 6, 8 |
| Method as described in FIG. 5 | 6, 4, 8 | 6, 4, 8, 2 | 6, 4, 8, 2, 10 |
| Method as described in FIG. 6 | 4, 6, 8 | 4, 6, 8, 10 | 4, 6, 8, 10, 2 |

From the table, it is implied that the method as described in FIG. 5, and the method as described in FIG. 6 provide superior results that the greedy method. Further, the table shows that the method as described in FIG. 5, and the method as described in FIG. 6 provide similar results with minor differences due ordering mass to charge ratios in the method as described in FIG. 6.

One of the aspects of the above is a system for selecting a set of mass to charge ratios for a set of gases 1002 to scan in a time budget. The system includes a first type of sensor 104 and a first mass to charge ratio extraction system 106. The first type of sensor 104 generates a scan output for the set of gases 1002 in a gas mixture. The scan output comprises spectra of detected ions as a function of the mass-to-charge ratio corresponding to the set of gases 1002. The first mass to charge ratio extraction system 106 is connected to the first type of sensor 104. The first mass to charge ratio extraction system comprises a memory unit and a specialized mass to charge ratio extraction processor. The memory unit stores a database 302 and a set of modules. The database 302 stores data related to standard fragmentation and ionization potentials for the set of gases 1002. The specialized mass to charge ratio extraction processor executes the set of modules. Characterized in that the set of modules include a first matrix multiplication module, a singular value decomposition module, a principal components obtaining module, a principal components multiplication module and an integral mass to charge ratio selection module. The first matrix multiplication module 304 is configured to pre-multiply a B matrix with a diagonal matrix that is created from a vector of inverses of nominal concentration of a gas to obtain an adjusted B matrix (Ba). The B matrix is a multiplication of P, T, C and R matrices. The P is a convolution matrix representing peak shapes, T is transmission efficiencies at each integral mass to charge ratio (m/z), R is relative ionization potentials for each gas and C is a reference spectrum representing idealized responses for each gas at the integral m/z value. The diagonal matrix is a matrix in which the entries outside the main diagonal are all zero. The singular value decomposition module 306 is configured to determine a singular value decomposition of $Ba^T = U*diag(E)*Vh$. The $Ba^T$ is a matrix transpose of the sub-matrix of the adjusted B matrix (Ba). The $U*diag(E)*Vh$ is the singular value decomposition (SVD) that is a factorization of a real or a complex matrix. The principal components obtaining module 308 is configured to obtain a number of first principal components of the $Ba^T$ based on an input. The principal components multiplication module 310 is configured to multiply each vector of the first principal component by its corresponding Eigen-value and adding the vectors of the first principal component that is multiplied with its corresponding Eigen-value for each column of the B matrix. The integral mass to charge ratio selection module 314 is configured to select top integral mass to charge ratios to scan by dropping all mass to charge ratio when mass to charge ratio is below to a threshold value (t).

In an embodiment, the system further comprises a mass to charge ratio dropping module 312 that is configured to drop the mass to charge ratio (m/z) that is below to the threshold value (t).

In another embodiment, the integral mass to charge ratio selection 314 module is configured to select an increased number of mass to charge ratios when the number of principal components (n) and the threshold value (t) are increased.

In another aspect of the above, a mass spectrometer system for selecting a mass to charge ratio one after another with non-conflicting information for a set of gases 1002 in a gas mixture in a time budget is provided. The mass spectrometer system includes a first type of sensor 104 and a second mass to charge ratio extraction system 202. The first type of sensor 104 generates a scan output for the set of gases 1002 in the gas mixture. The scan output comprises spectra of detected ions as a function of the mass-to-charge ratio corresponding to the set of gases 1002. The second mass to charge ratio extraction system 202 is connected to the first type of sensor 104. The second mass to charge ratio extraction system 202 comprises a memory unit and a specialized mass to charge ratio extraction processor. The memory unit stores a system database 402 and a set of modules. The system database 402 stores data related to standard fragmentation and ionization potentials for the set of gases 1002. The specialized mass to charge ratio extraction processor executes the set of modules. Characterized in that the set of modules include a second matrix multiplication module, a mass to charge ratio selection module and a mass to charge ratio determination module. The second matrix multiplication module 404 is configured to pre-multiply a B matrix with a diagonal matrix that is created from a vector of nominal concentration of a gas to obtain an adjusted B matrix (Ba). The mass to charge ratio selection module 406 is configured to (a) select a mass to charge ratio with maximum intensity in the column of the adjusted B matrix (Ba), (b) prioritize the gases in increasing order of total intensity in the B matrix at the selected mass to charge ratios, and (c) select a second mass to charge ratio with next highest intensity is selected when the first mass to charge ratio with maximum intensity is already selected. The mass to charge ratio determination module 408 is configured to (a) determine whether the mass to charge ratio exists for a first gas, and (b) determine whether the total number of picked mass to charge ratios is less than a total number of mass to charge ratio to prioritize a set of gases 1002 in the gas mixture.

In an embodiment, the mass to charge ratio determination module 408 is configured to (a) add the mass to charge ratio to a list of mass to charge ratio when the mass to charge ratio exists for the first gas and (b) delete the first gas from list of gases of the gas mixture when the mass to charge ratio does not exist for the first gas.

In another embodiment, the mass to charge ratio determination module 408 is configured to determine whether the list of gases is not empty or not to prioritize the set of gases 1002 in the gas mixture.

In another aspect of the above, a computer implemented method for selecting a set of mass to charge ratios of gas sample to scan using a first mass to charge ratio extraction system 106 is provided. Characterized by the method includes following steps of (a) generating 702, using a first type of sensor 104, a scan output for the set of gases 1002 in a gas mixture; (b) pre-multiplying 704, using a first matrix multiplication module 304, a B matrix with a diagonal matrix that is created from a vector of inverses of nominal concentration of a gas to obtain an adjusted B matrix (Ba); (c) determining 706, using a singular value decomposition module 306, a singular value decomposition of $Ba^T=U*diag(E)*Vh$; (d) obtaining 708, using a principal components obtaining module 308, a number of first principal components of the $Ba^T$ based on an input; (e) multiplying 710, using a principal components multiplication module 310, each vector of the first principal component by its corresponding Eigen-value and adding the vectors of the first principal component that is multiplied with its corresponding Eigen-value for each column of the B matrix; and (f) selecting 712, using an integral mass to charge ratio selection module 314, a top integral mass to charge ratios to scan by dropping all mass to charge ratio when mass to charge ratio is below to a threshold value (t). The scan output includes spectra of detected ions as a function of the mass-to-charge ratio corresponding to the set of gases. The $Ba^T$ is a matrix transpose of the sub-matrix of the adjusted B matrix (Ba). The $U*diag(E)*Vh$ is the singular value decomposition (SVD) that is a factorization of a real or a complex matrix.

In an embodiment, the method further includes a step of selecting, using the integral mass to charge ratio selection module 314, an increased number of mass to charge ratios when the number of principal components (n) and the threshold value (t) are increased.

In yet another aspect, a computer implemented method for selecting a mass to charge ratio one after another with non-conflicting information for a set of gases 1002 in a gas mixture using a second mass to charge ratio extraction system 202. Characterized by the method includes following steps of (a) generating 802, using a first type of sensor 104, a scan output for the set of gases 1002 in the gas mixture; (b) pre-multiplying 804, using a second matrix multiplication module 404, a B matrix with a diagonal matrix that is created from a vector of nominal concentration of a gas to obtain an adjusted B matrix (Ba); (c) selecting 806, using a mass to charge ratio selection module 406, a mass to charge ratio with maximum intensity in the column of the adjusted B matrix (Ba); (d) prioritizing 808, using the mass to charge ratio selection module 406, the gases in increasing order of total intensity in the B matrix at the selected mass to charge ratios; (e) selecting 810, using the mass to charge ratio selection module 406, a second mass to charge ratio with next highest intensity is selected when the first mass to charge ratio with maximum intensity is already selected; (f) determining 812, using a mass to charge ratio determination module 408, whether the mass to charge ratio exists for a first gas; (g) determining 814, using the mass to charge ratio determination module 408, whether the total number of picked mass to charge ratios is less than a total number of mass to charge ratio to prioritize the set of gases (1002) in the gas mixture; and (h) determining 816, using the mass to charge ratio determination module 408, whether the list of gases is not empty or not to prioritize the set of gases 1002 in the gas mixture.

In an embodiment, the method further includes a step of (a) adding, using the mass to charge ratio determination module 408, the mass to charge ratio to a list of mass to charge ratio when the mass to charge ratio exists for the first gas; and (b) deleting, using the mass to charge ratio determination module 408, the first gas from a list of gases of the gas mixture when the mass to charge ratio does not exist for the first gas.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system for scanning a gas mixture using a first type of sensor, the first type of sensor generating a scan output for a set of gases in the gas mixture and the scan output including spectra of detected ions as a function of mass to charge ratio corresponding to the set of gases, comprising:
a database for storing standard reference data related to standard fragmentation and ionization potentials the set of gases; and
a set of modules, wherein the set of modules comprises:
a matrix multiplication module that is configured to pre-multiply a B matrix with a diagonal matrix that is created with a vector of nominal concentration of the set of gases to obtain an adjusted B matrix, wherein the B matrix is a multiplication of P, T, C and R matrices relating to the standard reference data, wherein P is a convolution matrix representing peak shapes, T is transmission efficiencies at each integral mass to charge ratio, R is relative ionization potentials for each gas and C is a reference spectrum representing idealized responses for each gas at the integral mass to charge ratio; and
a mass to charge ratio extraction module that is configured to select a set of mass to charge ratios for the set of gases to scan in a time budget based on the adjusted B matrix.

2. The system according to claim 1, wherein the matrix multiplication module includes a first matrix multiplication module that is configured to pre-multiply the B matrix with a diagonal matrix that is created from a vector of inverses of the nominal concentration of the set of gases to obtain the adjusted B matrix, and
the mass to charge ratio extraction module includes:
a singular value decomposition module that is configured to determine a singular value decomposition of $Ba^T=U*diag(E)*Vh$, wherein the $Ba^T$ is a matrix transpose of the sub-matrix of the adjusted B matrix, wherein the $U*diag(E)*Vh$ is the singular value decomposition that is a factorization of a real or a complex matrix;
a principal components obtaining module that is configured to obtain a number of first principal components of the $Ba^T$ based on an input;
a principal components multiplication module that is configured to multiply each vector of the first principal component by its corresponding Eigen-value and adding the vectors of the first principal component that is multiplied with its corresponding Eigen-value for each column of the B matrix; and
an integral mass to charge ratio selection module that is configured to select a top integral mass to charge ratios to scan by dropping all mass to charge ratio when mass to charge ratio is below to a threshold value.

3. The system according to claim 2, wherein the mass to charge ratio extraction module further includes a mass to charge ratio dropping module that is configured to drop the mass to charge ratio that is below to the threshold value.

4. The system according to claim 2 or 3, wherein the integral mass to charge ratio selection module is configured to select an increased number of mass to charge ratios when the number of principal components and the threshold value are increased.

5. The system according to claim 1, wherein the matrix multiplication module includes a second matrix multiplication module that is configured to pre-multiply the B matrix with the diagonal matrix that is created from a vector of the nominal concentration of the set of gases to obtain the adjusted B matrix, and
the mass to charge ratio extraction module includes:
a mass to charge ratio selection module that is configured to
select a mass to charge ratio with maximum intensity in the column of the adjusted B matrix;
prioritize the gases in increasing order of total intensity in the B matrix at the selected mass to charge ratios; and
select a second mass to charge ratio with next highest intensity is selected when the first mass to charge ratio with maximum intensity is already selected, and
a mass to charge ratio determination module that is configured to
determine whether the mass to charge ratio exists for a first gas; and
determine whether the total number of picked mass to charge ratios is less than a total number of mass to charge ratio to prioritize a set of gases in the gas mixture.

6. The system according to claim 5, wherein the mass to charge ratio determination module is further configured to
add the mass to charge ratio to a list of mass to charge ratio when the mass to charge ratio exists for the first gas; and
delete the first gas from list of gases of the gas mixture when the mass to charge ratio does not exist for the first gas.

7. The system according to claim 5, wherein the mass to charge ratio determination module is further configured to determine whether the list of gases is not empty or not to prioritize the set of gases in the gas mixture.

8. The system according to claim 1, wherein the set of modules further includes analyzing module that is configured to analyze the gas mixture based on the scan output including the set of mass to charge ratios selected.

9. The system according to claim 1, further comprising:
a memory that stores the database and the set of modules; and
a processor that executes the set of modules.

10. The system according to claim 1, further comprising a first type of sensor.

11. A method implemented on a computer that includes selecting a set of mass to charge ratios of a gas mixture to scan using a first type of sensor, wherein the first type of sensor generates a scan output for a set of gases in the gas mixture and the scan output includes spectra of detected ions as a function of mass to charge ratio corresponding to the set of gases, wherein the selecting a set of mass to charge ratios includes:
pre-multiplying, a B matrix with a diagonal matrix that is created with a vector of nominal concentration of the set of gases to obtain an adjusted B matrix, wherein the B matrix is a multiplication of P, T, C and R matrices, wherein P is a convolution matrix representing peak shapes, T is transmission efficiencies at each integral mass to charge ratio, R is relative ionization potentials for each gas and C is a reference spectrum representing idealized responses for each gas at the integral mass to charge ratio; and
extracting a set of mass to charge ratios for the set of gases to scan in a time budget based on the adjusted B matrix.

12. The method according to claim 11, wherein the pre-multiplying includes pre-multiplying the B matrix with a diagonal matrix that is created from a vector of inverses of the nominal concentration of the set of gases to obtain the adjusted B matrix, and
the extracting includes:
determining a singular value decomposition of $Ba^T=U*diag(E)*Vh$, wherein the $Ba^T$ is a matrix transpose of the sub-matrix of the adjusted B matrix, wherein the $U*diag(E)*Vh$ is the singular value decomposition that is a factorization of a real or a complex matrix;
obtaining a number of first principal components of the $Ba^T$ based on an input;
multiplying each vector of the first principal component by its corresponding Eigen-value and adding the vectors of the first principal component that is multiplied with its corresponding Eigen-value for each column of the B matrix; and
selecting a top integral mass to charge ratios to scan by dropping all mass to charge ratio when mass to charge ratio is below to a threshold value.

13. The method according to claim 12, wherein the extracting further including selecting an increased number of mass to charge ratios when the number of principal components and the threshold value are increased.

14. The method according to claim 11, wherein the pre-multiplying includes
pre-multiplying, the B matrix with a diagonal matrix that is created from the vector of the nominal concentration of the set of gases to obtain the adjusted B matrix; and
the extracting includes:
selecting, a mass to charge ratio with maximum intensity in the column of the adjusted B matrix;
prioritizing the gases in increasing order of total intensity in the B matrix at the selected mass to charge ratios;
selecting a second mass to charge ratio with next highest intensity is selected when the first mass to charge ratio with maximum intensity is already selected;
determining whether the mass to charge ratio exists for a first gas;
determining whether the total number of picked mass to charge ratios is less than a total number of mass to charge ratio to prioritize the set of gases in the gas mixture; and
determining whether the list of gases is not empty or not to prioritize the set of gases in the gas mixture.

15. The method according to claim 14, wherein the extracting further includes:
adding the mass to charge ratio to a list of mass to charge ratio when the mass to charge ratio exists for the first gas; and
deleting the first gas from a list of gases of the gas mixture when the mass to charge ratio does not exist for the first gas.

16. The method according to claim 11, further comprising analyzing the gas mixture based on the scan output for the set of mass to charge ratios selected.

17. A nontransitory computer readable medium encoded with a computer program including instructions for a computer to operate as the system according to claim 1.

* * * * *